United States Patent [19]

Inabata et al.

[11] Patent Number: 4,906,078
[45] Date of Patent: Mar. 6, 1990

[54] VARIABLE MAGNIFICATION VIEWFINDER

[75] Inventors: Tatsuo Inabata; Toshihide Nozawa, both of Tokyo, Japan

[73] Assignee: Olympus Optical Co., Ltd., Tokyo, Japan

[21] Appl. No.: 231,676

[22] Filed: Aug. 11, 1988

[30] Foreign Application Priority Data

Aug. 12, 1988 [JP] Japan ............................... 62-199690

[51] Int. Cl.[4] ..................... G02B 15/177; G02B 13/18
[52] U.S. Cl. .................................... 350/423; 350/426; 350/427; 350/432; 350/560
[58] Field of Search ................ 350/423, 427, 432–435, 350/426, 560, 570

[56] References Cited

U.S. PATENT DOCUMENTS 3,438,689  4/1969  Wehr ............................. 350/423 X
4,779,969 10/1988  Sato et al. ..................... 350/426 X

FOREIGN PATENT DOCUMENTS 61-87122   5/1986  Japan .
61-156018  7/1986  Japan .
61-156019  7/1986  Japan .
61-160713  7/1986  Japan .
62-7017    1/1987  Japan .

Primary Examiner—Scott J. Sugarman
Attorney, Agent, or Firm—Cushman, Darby & Cushman

[57] ABSTRACT

A variable magnification viewfinder so designed as to correct aberrations favorably and minimize variations of aberrations caused by varying magnification level thereof. The variable magnification viewfinder comprises an objective lens system and an eyepiece lens system, the objective lens system comprises in the order from the object side, a first negative lens unit, a second positive lens unit and a third positive lens unit, and is adapted in such a manner that magnification of the viewfinder is varied by shifting the second and third lens units along the optical axis with the first lens unit kept fixed.

9 Claims, 8 Drawing Sheets

FIG. 5
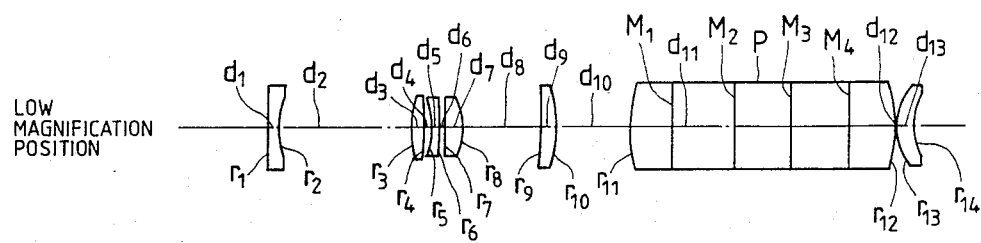
LOW MAGNIFICATION POSITION
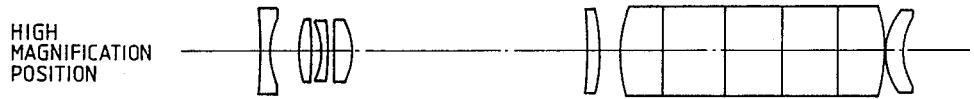
HIGH MAGNIFICATION POSITION
FIG. 6
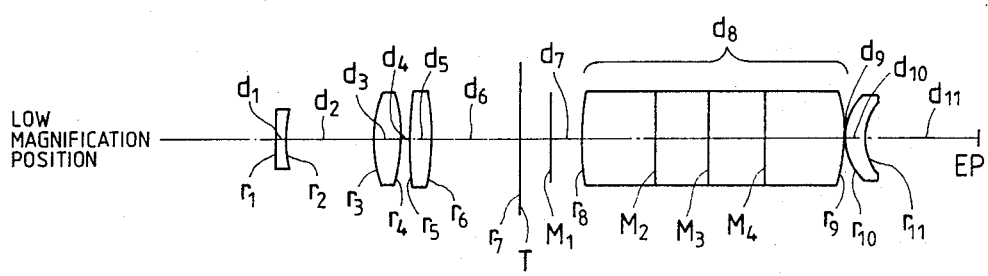
LOW MAGNIFICATION POSITION
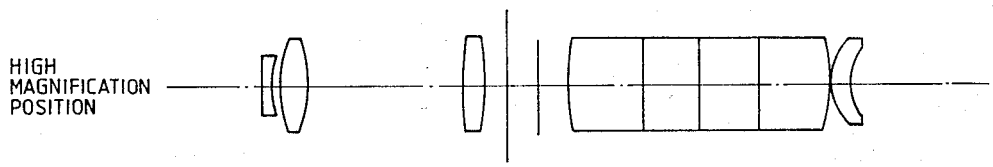
HIGH MAGNIFICATION POSITION

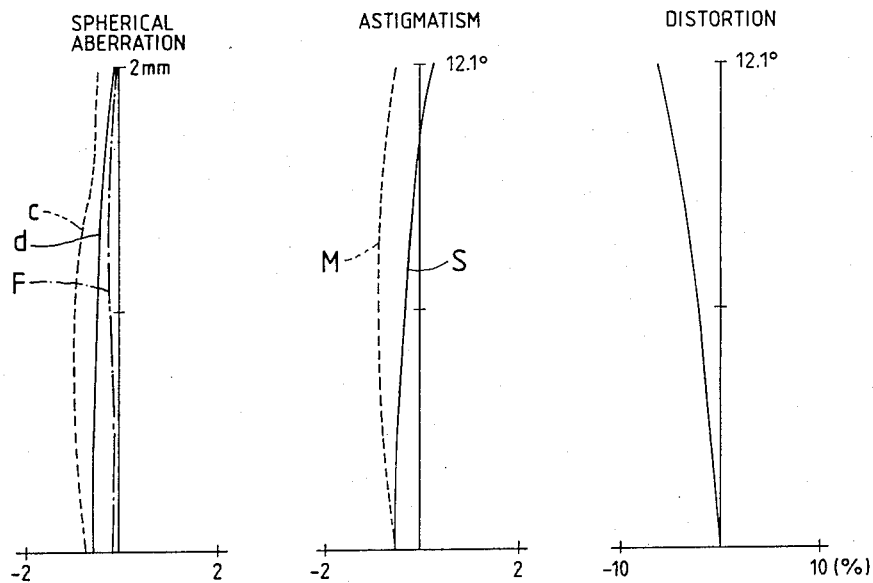
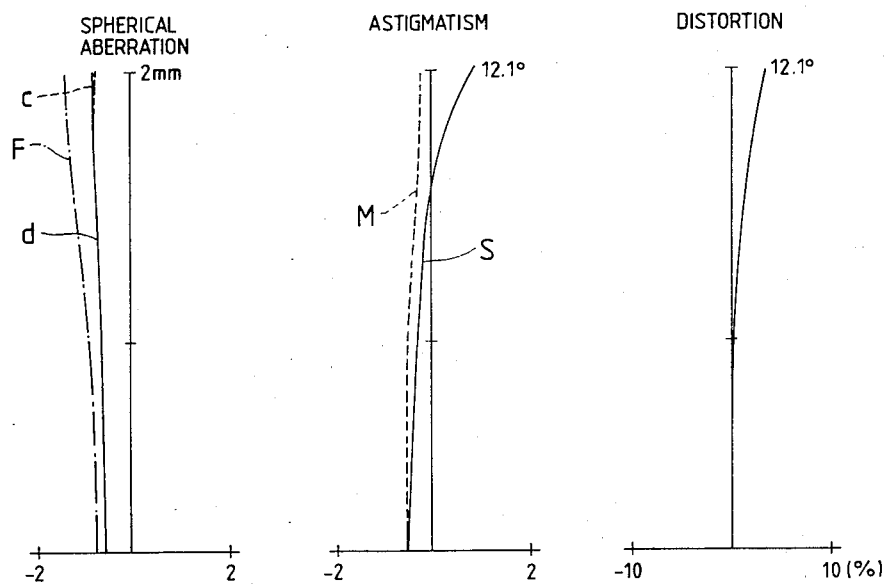

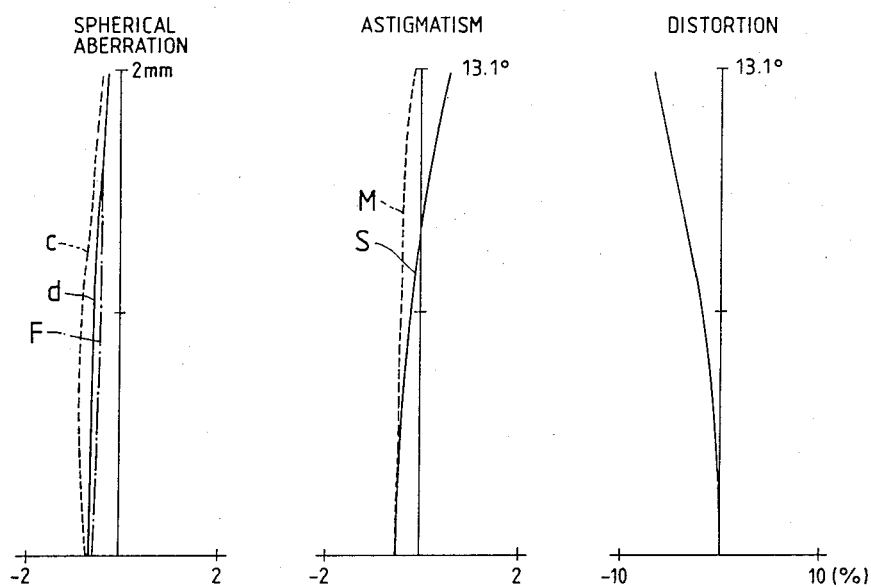
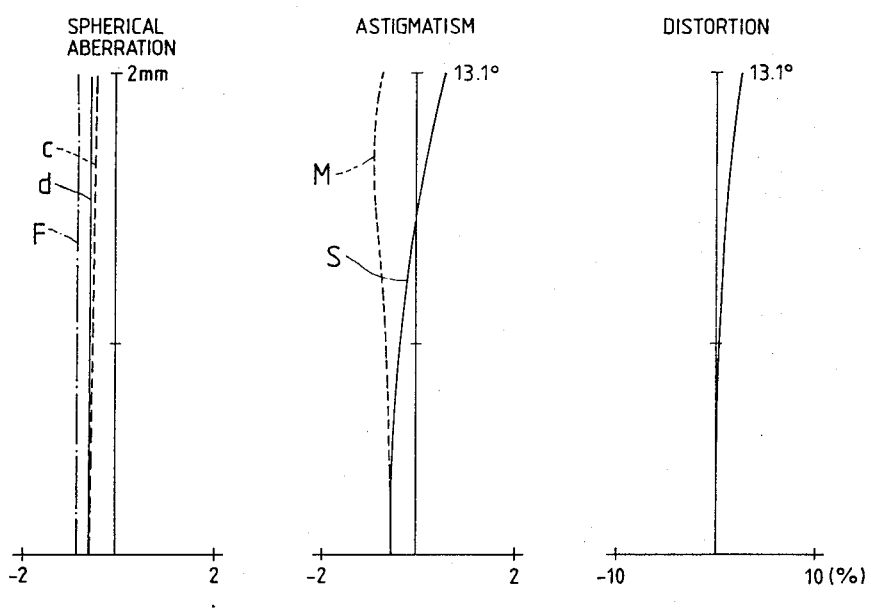

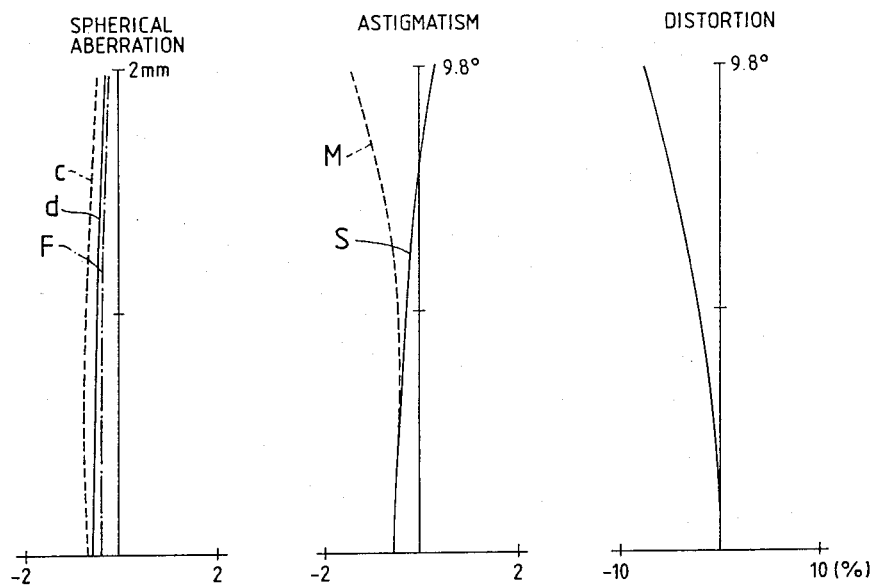
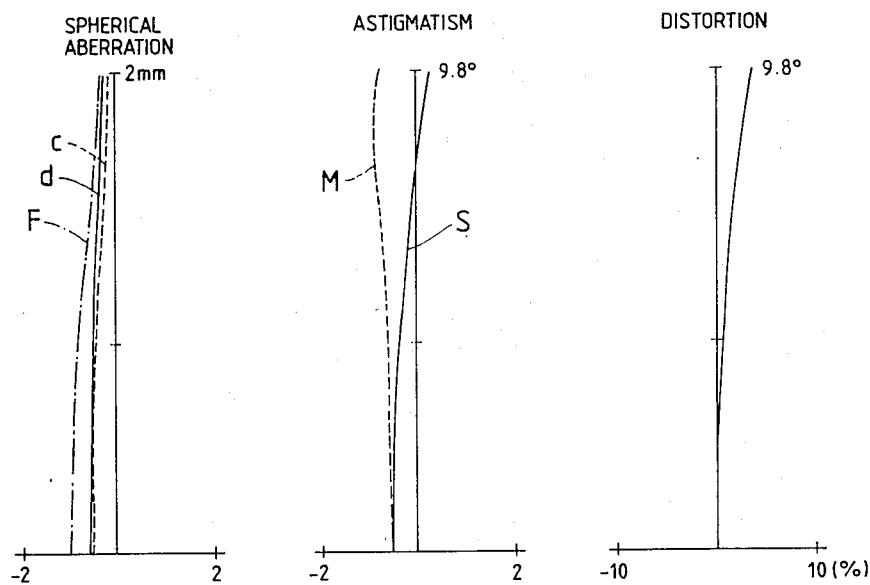

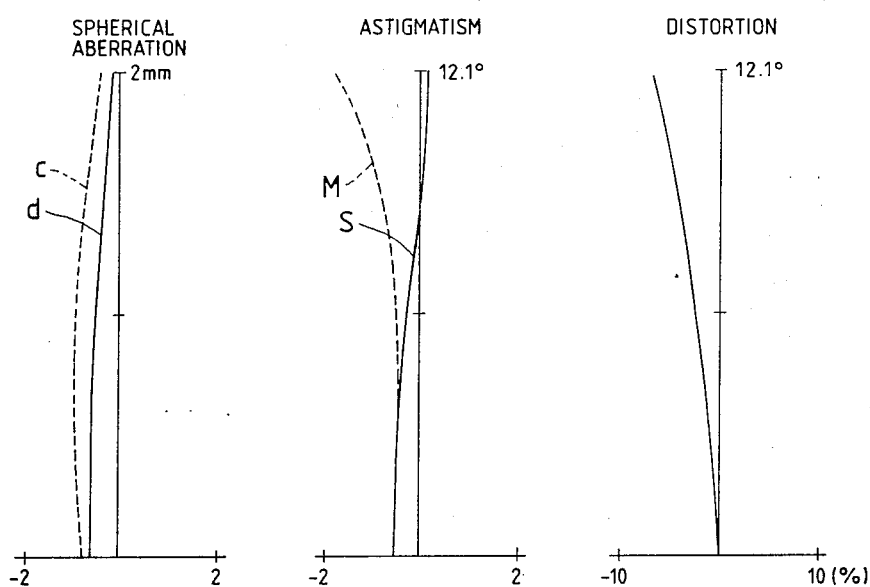
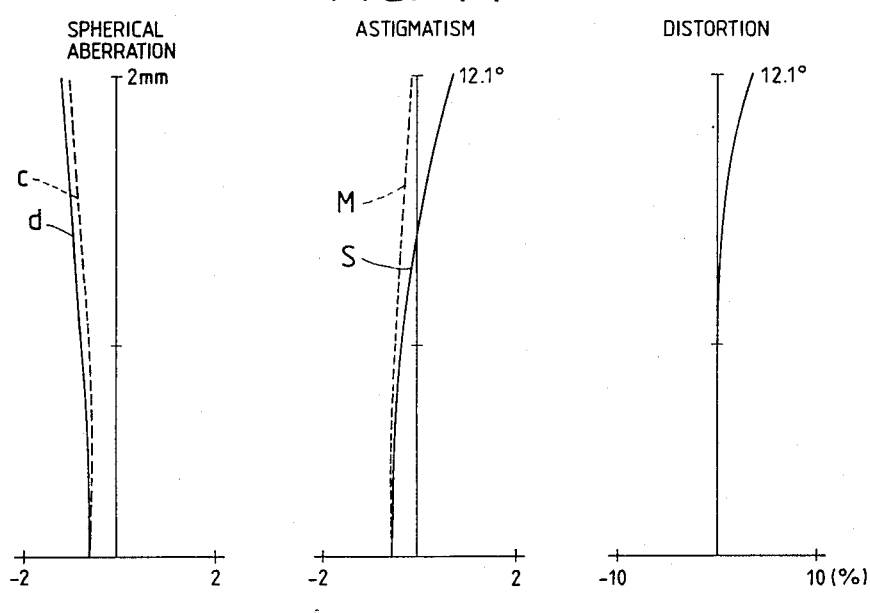

VARIABLE MAGNIFICATION VIEWFINDER

BACKGROUND OF THE INVENTION (a) Field of the Invention

The present invention relates to a variable magnification viewfinder to be used with photographic cameras, still video cameras, video cameras, etc. for clearly informing photographers of photographing ranges by varying magnification of the viewfinder.

(b) Description of the Prior Art

Viewfinder optical systems are used separately from photographing optical systems. Out of these viewfinder optical systems, the inverted Galilean viewfinder can be mentioned as a representative of variable magnification type of viewfinders.

In order to match diopter of the visual field with that of the optical frame and align the optical axes of emerging lights, a variable magnification viewfinder uses a reflecting mirror inclined 45° relative to the optical axis in the course of the optical system of the visual field in case of the light-admitting viewfinder or a half mirror in case of the Albada viewfinder. For this reason, a long lens shift distance cannot be reserved and a high variable magnification ratio cannot be obtained when an attempt is made to design an inverted Galilean viewfinder capable of varying magnification thereof. If an attempt is made to obtain a high variable magnification ratio, the viewfinder will have a large diameter, thereby making it impossible to design a compact camera. Further, it is obliged to lower magnification level of the viewfinder, thereby making it impossible to obtain a viewfinder having sufficient performance. For example, the Albada type of inverted Galilean variable magnificatin viewfinder disclosed by Japanese Unexamined Published Patent Application No. 87122/61 is not satisfactory in both the variable magnification ratio and magnification level thereof.

On the other hand, Keplerian viewfinder, which uses a visual field frame (optical frame) arranged at the intermediate imaging position, facilitates to match diopter of the visual field with that of the optical frame and is capable of aligning optical axes of the emerging lights, thereby requiring no wide space for multiple optical systems and permitting to obtain desired variable magnification ratio without enlarging lens diameter or prolonging total length of the optical system.

As such Keplerian variable magnification viewfinders, there have already been known those disclosed by Japanese Unexamined Published Patent Application Nos. 156018/61, 160713/61, 156019/61 and 7017/62. However, all of these viewfinders are designed for variable magnification ratios lower than 2 and unsatisfactory in the imaging performance thereof. Out of these viewfinders, those disclosed by Japanese Unexamined Published Patent Application Nos. 7017/62 and 156018/61 allow large variations of diopters to be caused by varying magnification and are unsatisfactory for practical use.

SUMMARY OF THE INVENTION

A primary object of the present invention is to provide a Keplerian variable magnification viewfinder having a small outside diameter, a simple composition, a variable magnification ratio of 2 or higher, favorably corrected aberrations and allowing very little variations of aberrations to be caused by varying magnification thereof.

The variable magnification viewfinder according to the present invention has the composition illustrated in FIG. 1. Speaking concretely, the viewfinder according to the present invention is a real image viewfinder composed of an objective lens system $G_I$ having positive refractive power as a whole and an eyepiece lens system $G_{II}$ having positive refractive power as a whole, said objective lens system $G_I$ comprised, in order from the object side, a first lens unit $G_1$ having negative refractive power, a second lens unit $G_2$ having positive refractive power and a third lens unit $G_3$ having positive refractive power. The variable magnification viewfinder according to the present invention has the composition described above, performs variation of magnification by shifting the second lens unit $G_2$ toward the object side along the optical axis and simultaneously carries out adjustment of diopter by shifting the third lens unit $G_3$ along the optical axis, thereby varying from the low magnification position to the high magnification position.

Let us designate magnification level of the second lens unit $G_2$ having the variable magnification function as $\beta_2$ in the optical system described above. In a case where $\beta_2$ varies within a range of $|\beta_2| \leq 1$, since distance $\overline{IO}$ between the object point $O$ and image point $I$ of the second lens unit $G_2$ is the minimum at $\beta_2 = 1$, and diopter is adjusted by shifting the third lens unit $G_3$ toward the eyepiece. When $\beta_2$ varies within a range of $|\beta_2| > 1$, diopter is adjusted by shifting the third lens unit $G_3$ toward the object side. In this optical system, an erect image of the visual field can be obtained by interposing an optical element P such as a porro prism, an image rotator or an imaging optical system for inverting an image formed at an intermediate position in the up-down and right-left directions between the objective lens system $G_I$ and the eyepiece lens system $G_{II}$.

When $|\beta_2|$ does not exceed 1 at the high magnification position as in the Embodiment 1 described later, diopter is adjusted by shifting the third lens unit $G_3$ only in the direction toward the eyepiece lens $G_{II}$ at the stage to vary magnification from the low magnification position toward the high magnification position. In the case where $|\beta_2|$ does not exceed 1 at the high magnification position as described above, the second lens unit $G_2$ has a function to enhance magnification and the third lens unit $G_3$ simultaneously has the function to enhance magnification, thereby making it possible to efficiently impart the variable magnification effect to the viewfinder. However, this effect is not limited within the range of $|\beta_2| \leq 1$, and the object of the present invention can be accomplished even when $\beta_2$ varies within a range of 0.6 to 1.3 as in the Embodiment 4 described later.

Focal length $f_2$ of the second lens unit $G_2$ arranged in the objective lens system $G_I$ should desirably be set so as to satisfy the following condition:

$1.2 < f_2/f_{IW}$ wherein the reference symbol $f_{IW}$ represents focal length of the objective lens system $G_I$ at the low magnification position.

If the second lens unit $G_2$ has refractive power high enough to exceed the upper limit of the above-mentioned condition, astigmatism and coma will vary remarkably from the lower magnification position to the high magnification position, thereby degrading image quality.

Further, in order to correct the coma, astigmatism and distortion produced by the second lens unit $G_2$, it is preferable to select a composition that the first lens unit $G_1$ comprises at least one negative lens component, and the second lens unit comprises at least one positive lens component and at least one negative lens component. In this case, it is also preferable, for suppressing variations of the aberrations caused by the variable magnification operation, to select focal length of the second lens unit $G_2$ within the range defined by the following condition:

$$1.5 < f_2/f_{IW}$$

Lateral chromatic aberration is produced when the Keplerian zoom lens has a high variable magnification ratio. In order to correct this aberration, it is preferable to use at least one pair with a positive lens component having an Abbe's number of at least 50 and a negative lens component having an Abbe's number of 40 or smaller in the second lens unit $G_2$. In this case, a pair of the positive lens component and the negative lens component be cemented to each other. furthermore, in order to correct astigmatism and coma with good balance while minimizing distortion at the low and high magnification positions, it is preferable to use at least one a spherical surface in the second lens unit $G_2$ and at least one aspherical surface in the third lens unit $G_3$ respectively.

Moreover, in case where variable magnification ratio is designed on the order of 2, it is possible to reduce the number of lens components to one for the second lens unit $G_2$ in the objective system $G_I$. In this case, it is preferable to design one surface of this lens component as an aspherical surface since it serves for suppressing variations of coma and astigmatism produced during the zooming operation.

In the viewfinder according to the present invention, the intermediate imaging position needs not be set in front of the first reflecting surface of the porro prism P, but may be set at any location between the first and second reflecting surfaces, between the second and third reflecting surfaces, between the third and fourth reflecting surfaces, or after the fourth reflecting surface. In addition, it is possible to use, in place of the porro prism, an optical element or optical system such as an image rotator or imaging optical system which inverts an image in the up-down and right-left directions.

However, when the variable magnification viewfinder according to the present invention is used, for example, as a collimator of an astronomical telescope, it is unnecessary to use the above-mentioned optical system for inverting an image in the up-down and right-left directions. By selecting the composition described above, it is possible to obtain a Keplerian variable magnification viewfinder having a small outside diameter and little variations of aberrations.

BRIEF DESCRIPTION OF THE DRAWINGS

FIG. 2 through FIG. 6 show sectional views illustrating compositions of Embodiments 1 through 5 of the variable magnification viewfinder according to the present invention;

FIG. 7 and FIG. 8 show curves illustrating aberration characteristics of the Embodiment 1 of the present invention;

FIG. 9 and FIG. 10 show curves illustrating aberration characteristics of the Embodiment 2 of the present invention;

FIG. 11 and FIG. 12 show curves illustrating aberration characteristics of the Embodiment 3 of the present invention;

FIG. 13 and FIG. 14 show curves illustrating aberration characteristics of the Embodiment 4 of the present invention.

DETAILED DESCRIPTION OF THE PREFERRED EMBODIMENTS

Now, preferred embodiments of the variable magnification viewfinder according to the present invention will be described consecutively below.

Figure 1:
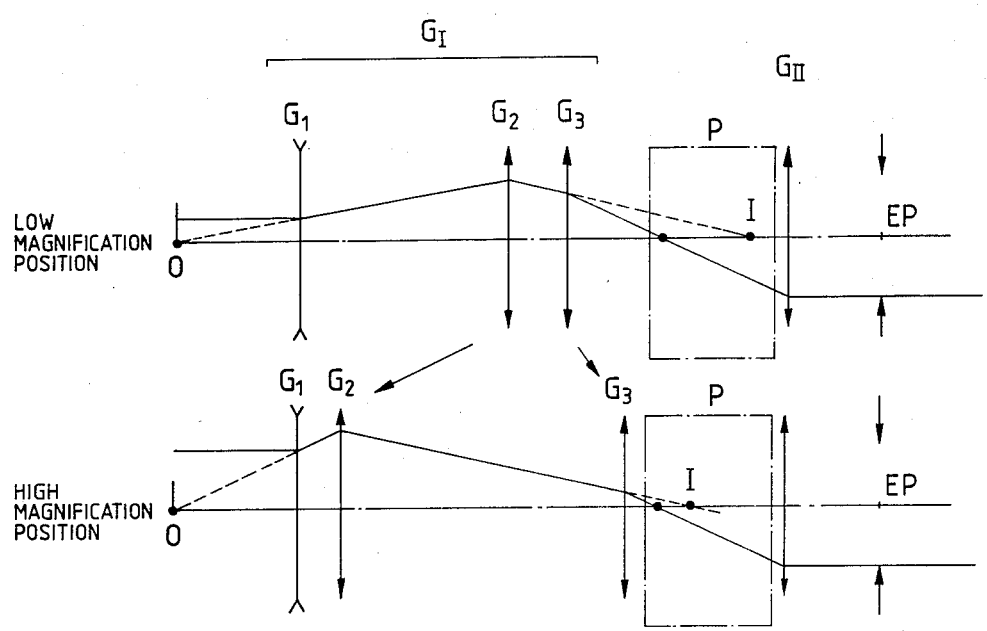
FIG. 1 shows a diagram illustrating the fundamental composition of the variable magnification viewfinder according to the present invention.
Figure 2:
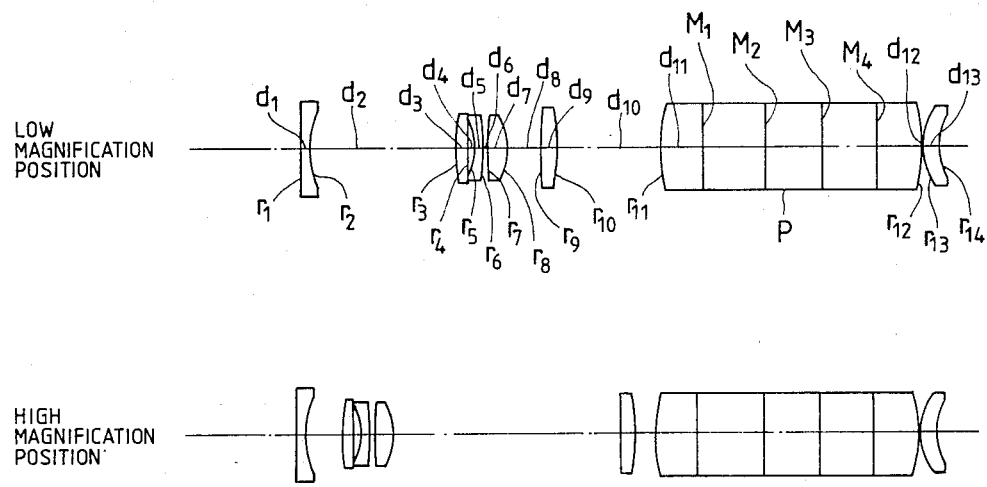

The Embodiment 1 of the present invention has the composition shown in FIG. 2. Speaking concretely, the Embodiment 1, of the present invention comprises an objective lens system $G_I$ comprising a first lens unit $G_1$ consisting of a single negative lens component, a second lens unit $G_2$ consisting of a positive lens component having low dispersing power, a negative lens component having high dispersing power and an aspherical lens component having an aspherical surface on one side, and a third lens unit $G_3$ consisting of an aspherical lens component having an spherical surface on one side, a porro prism P having spherical surfaces on the incidence side and emerging side, and an eyepiece lens system $G_{II}$ comprising an aspherical lens component having an aspherical surface on one side, whereby an intermediate image is formed on the incidence side and surface of the porro prism P. In FIG. 2 the reference symbols $M_1$, $M_2$, $M_3$ and $M_4$ represent the first, second, third and fourth reflecting surfaces respectively.

The Embodiment 1 has the numerical data shown below and the aberration characteristics shown in FIG. 7 and FIG. 8 at the low magnification position and the high magnification position respectively thereof:

| $f_I = 12.549$-$32.00$, $f_{II} = 27.28$ | | | |
|---|---|---|---|
| $r_1 = -193.9146$ | | | |
| | $d_1 = 1.5593$ | $n_1 = 1.49216$ | $\nu_1 = 57.50$ |
| $r_2 = 19.5937$ | | | |
| | $d_2 = D_1$ | | |
| $r_3 = 26.9942$ | | | |
| | $d_3 = 2.0006$ | $n_2 = 1.72916$ | $\nu_2 = 54.68$ |
| $r_4 = -70.3255$ | | | |
| | $d_4 = 1.2097$ | | |
| $r_5 = -13.2007$ | | | |
| | $d_5 = 1.3403$ | $n_3 = 1.80518$ | $\nu_3 = 25.43$ |
| $r_6 = -56.3597$ | | | |
| | $d_6 = 1.0002$ | | |
| $r_7 = 60.6809$ | | | |
| | $d_7 = 3.0002$ | $n_4 = 1.49216$ | $\nu_4 = 57.50$ |
| $r_8 = -11.1119$ (aspherical surface) | | | |
| | $d_8 = D_2$ | | |
| $r_9 = 188.4302$ | | | |
| | $d_9 = 2.4997$ | $n_5 = 1.49216$ | $\nu_5 = 57.50$ |
| $r_{10} = -27.1673$ (aspherical surface) | | | |
| | $d_{10} = D_3$ | | |
| $r_{11} = 22.6270$ | | | |
| | $d_{11} = 43.4000$ | $n_6 = 1.49216$ | $\nu_6 = 57.50$ |
| $r_{12} = -22.6270$ | | | |
| | $d_{12} = 0.2000$ | | |
| $r_{13} = 9.9775$ (aspherical surface) | | | |
| | $d_{13} = 2.7600$ | $n_7 = 1.49216$ | $\nu_7 = 57.50$ |

-continued $f_I = 12.549-32.00, f_{II} = 27.28$ $r_{14} = 12.3320$
  $d_{14} = 16.3$
$r_{15}$ eye point

| | W | S | T |
|---|---|---|---|
| $D_1$ | 24.353 | 13.981 | 5.753 |
| $D_2$ | 6.156 | 23.118 | 38.638 |
| $D_3$ | 16.881 | 10.291 | 2.999 |

Figure 3:
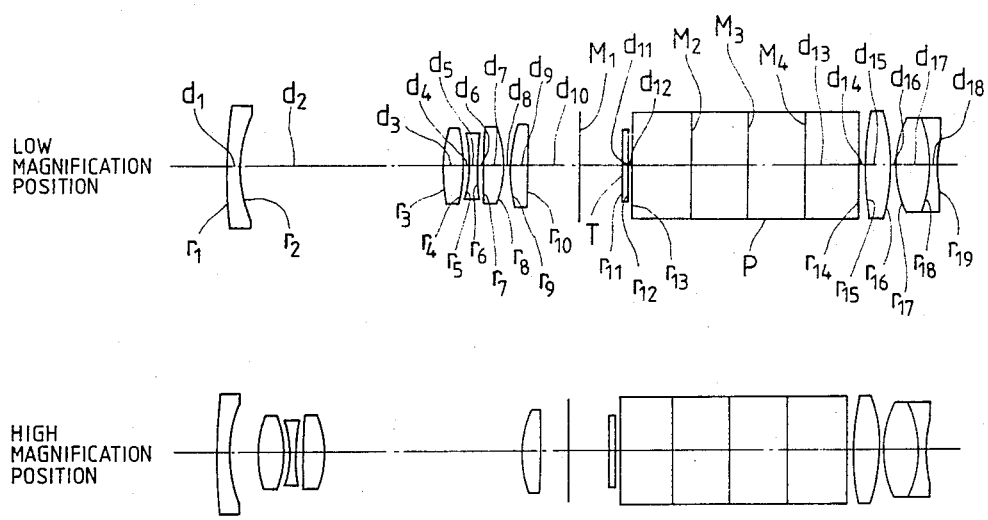

Coefficient of aspherical surface $P_8 = 1, E_8 = 0.99485 \times 10^{-4}$
$F_8 = -0.27888 \times 10^{-6}, G_8 = 0.91165 \times 10^{-8}$
$P_{10} = 1, E_{10} = 0.30403 \times 10^{-4}$
$F_{10} = 0.83713 \times 10^{-6}, G_{10} = -0.47674 \times 10^{-7}$
$H_{10} = 0.78973 \times 10^{-9}$
$P_{13} = 1, E_{13} = -0.44249 \times 10^{-4}$
$F_{13} = -0.36906 \times 10^{-6}$
$G_{13} = -0.65538 \times 10^{-8}$
$\beta_2 = -0.538 - -0.950, f_2/f_{IW} = 1.83$ The Embodiment 2 of the present invention has the composition shown in FIG. 3 wherein the variable magnification viewfinder comprises: an objective system $G_I$ comprising a first lens unit $G_1$ consisting of a single negative lens component, a second lens unit $G_2$ consisting of three positive, negative and positive lens components, i.e., a positive lens component having low dispersive power, a negative lens component having high dispersive power and an aspherical lens component having an aspherical surface on one side and a third lens unit $G_3$ consisting of an aspherical lens component having an aspherical surface on one side; a prism P; and an eyepiece lens system $G_{II}$ comprising two lens components consisting of three lens elements. In FIG. 3, the reference symbol $M_1$ represents a first reflecting surface (reflecting mirror), and the reference symbols $M_2$, $M_3$ and $M_4$ designate second, third and fourth reflecting surfaces respectively, and the reference symbol T denotes a visual field frame and a range finding frame. In the Embodiment 2, an intermediate imaging position is located before the second reflecting surface.

The Embodiment 2 has the numerical data shown below and the aberration characteristics illustrated in FIG. 9 and FIG. 10 at the low magnification position and the high magnification position thereof:

$f_I = 11.5-29.33, f_{II} = 22.99$ $r_1 = 76.4470$
  $d_1 = 1.5600$  $n_1 = 1.49216$  $\nu_1 = 57.50$
$r_2 = 18.7500$
  $d_2 = D_1$
$r_3 = 18.4600$
  $d_3 = 3.7000$  $n_2 = 1.51633$  $\nu_2 = 64.15$
$r_4 = -26.0420$
  $d_4 = 1.0000$
$r_5 = -17.1500$
  $d_5 = 1.3400$  $n_3 = 1.72342$  $\nu_3 = 37.95$
$r_6 = 46.4050$
  $d_6 = 1.0000$
$r_7 = 71.4328$ (aspherical surface)
  $d_7 = 3.5000$  $n_4 = 1.49216$  $\nu_4 = 57.50$
$r_8 = -14.0340$
  $d_8 = D_2$
$r_9 = 18.5690$
  $d_9 = 3.1000$  $n_5 = 1.49216$  $\nu_5 = 57.50$
$r_{10} = -90.8889$ (aspherical surface)
  $d_{10} = D_3$
$r_{11} = \infty$
  $d_{11} = 1.0000$  $n_6 = 1.49216$  $\nu_6 = 57.50$
$r_{12} = \infty$
  $d_{12} = 0.5000$
$r_{13} = \infty$ -continued $f_I = 11.5-29.33, f_{II} = 22.99$ $d_{13} = 37.0000$  $n_7 = 1.49216$  $\nu_7 = 57.50$
$r_{14} = \infty$
  $d_{14} = 0.7000$
$r_{15} = 37.7030$
  $d_{15} = 4.5000$  $n_8 = 1.69895$  $\nu_8 = 30.12$
$r_{16} = -27.7800$
  $d_{16} = 0.5000$
$r_{17} = 16.3040$
  $d_{17} = 5.8000$  $n_9 = 1.51633$  $\nu_9 = 64.15$
$r_{18} = -19.1100$
  $d_{18} = 1.3000$  $n_{10} = 1.80518$  $\nu_{10} = 25.43$
$r_{19} = 26.5170$
  $d_{19} = 15.0000$
$r_{20}$ eye point

| | W | S | T |
|---|---|---|---|
| $D_1$ | 34.185 | 19.304 | 5.465 |
| $D_2$ | 1.000 | 18.512 | 33.870 |
| $D_3$ | 15.651 | 13.020 | 11.500 |

Figure 4:
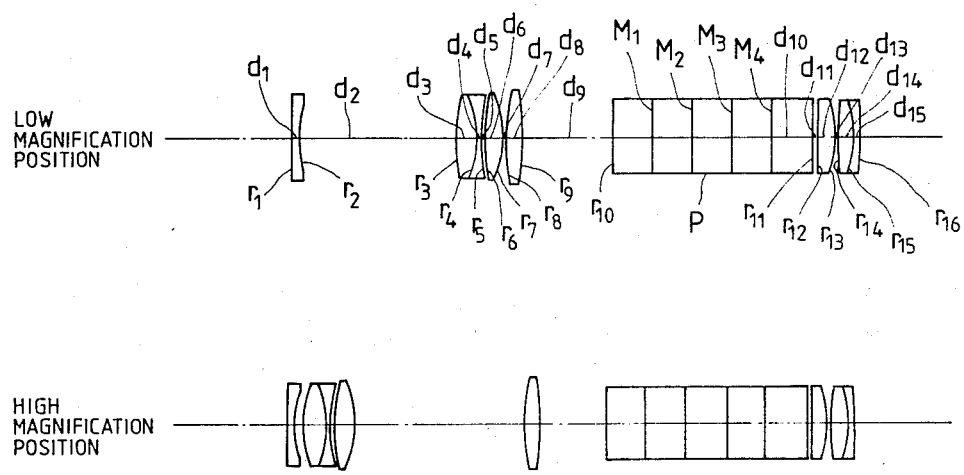

Coefficient of aspherical surface $P_7 = 1, E_7 = -0.41861 \times 10^{-4}$
$F_7 = 0.26746 \times 10^{-6}, G_7 = -0.59330 \times 10^{-8}$
$P_{10} = 1, E_{10} = 0.21247 \times x 10^{-4}$
$F_{10} = -0.10853 \times 10^{-7}$
$G_{10} = -0.27821 \times 10^{-9}$
$\beta_2 = -0.527 - -1.030, f_2/f_{IW} = 2.68$ The Embodiment 3 of the present invention has the composition illustrated in FIG. 4. That is to say, the Embodiment 3 comprises: an objective lens system $G_I$ comprising a first lens unit $G_1$ consisting of a single negative lens component, a second lens unit $G_2$ consisting of two components of three lens elements., i.e., a cemented doublet composed of a positive lens element having low dispersive power and a negative lens element having high dispersive power, and an aspherical lens component having an aspherical surface on one side, and a third lens unit $G_3$ consisting of an aspherical lens component having an aspherical surface on one side; a porro prism P; and an eyepiece system $G_{II}$ consisting of two components of three lens elements. In the Embodiment 3, an intermediate image is formed on the incidence end surface of the porro prism. In FIG. 4, the reference symbols $M_1$, $M_2$, $M_3$ and $M_4$ represents the first, second, third and fourth reflecting surfaces respectively.

The Embodiment 3 of the present invention has the numerical data shown below and the aberration characteristics illustrated in FIG. 11 and FIG. 12 at the low magnification position and high magnification position thereof:

$f_I = 11.119-28.35, f_{II} = 24.80$ $r_1 = 1160.7500$
  $d_1 = 1.2000$  $n_1 = 1.49216$  $\nu_1 = 57.50$
$r_2 = 23.2100$
  $d_2 = D_1$
$r_3 = 23.3800$
  $d_3 = 3.5000$  $n_2 = 1.60311$  $\nu_2 = 60.70$
$r_4 = -18.0000$
  $d_4 = 1.0000$  $n_3 = 1.67270$  $\nu_3 = 32.10$
$r_5 = 28.9340$
  $d_5 = 0.5000$
$r_6 = 29.4000$ (aspherical surface)
  $d_6 = 3.0000$  $n_4 = 1.49216$  $\nu_4 = 57.50$
$r_7 = -20.1790$
  $d_7 = D_2$
$r_8 = 27.4900$
  $d_8 = 3.0000$  $n_5 = 1.49216$  $\nu_5 = 57.50$
$r_9 = -27.9670$ (aspherical surface)
  $d_9 = D_3$ -continued $f_I = 11.119-28.35, f_{II} = 24.80$ $r_{10} = \infty$
$\quad d_{10} = 33.0000 \quad n_6 = 1.51633 \quad \nu_6 = 64.15$
$r_{11} = \infty$
$\quad d_{11} = 0.5000$
$r_{12} = \infty$
$\quad d_{12} = 2.6000 \quad n_7 = 1.49216 \quad \nu_7 = 57.50$
$r_{13} = -22.9600$
$\quad d_{13} = 0.5000$
$r_{14} = 30.0300$
$\quad d_{14} = 2.8000 \quad n_8 = 1.51633 \quad \nu_8 = 64.15$
$r_{15} = -15.8700$
$\quad d_{15} = 1.2000 \quad n_9 = 1.60342 \quad \nu_9 = 38.01$
$r_{16} = -77.9000$
$\quad d_{16} = 15.0000$
$r_{17}$ eye point

|     | W      | S      | T      |
|-----|--------|--------|--------|
| $D_1$ | 25.920 | 13.190 | 1.600  |
| $D_2$ | 0.500  | 15.760 | 29.000 |
| $D_3$ | 14.890 | 12.360 | 10.710 |

Coefficient of aspherical surface
$P_6 = 1, E_6 = -0.11200 \times 10^{-8}$
$F_6 = -0.64400 \times 10^{-6}, G_6 = 0.37000 \times 10^{-8}$
$P_9 = 1, E_9 = 0.54800 \times 10^{-4}$
$F_9 = -0.18700 \times 10^{-6}$
$G_9 = -0.81000 \times 10^{-9}$
$\beta_2 = -0.519 - -0.998, f_2/f_{IW} = 2.367$ The Embodiment 4 of the present invention has the composition illustrated in FIG. 5. In this embodiment, each of the lens units has the same composition as that in the Embodiment 1 already described above. However, in the Embodiment 4 wherein magnification $\beta_2$ of the second lens unit $G_2$ varies around a magnification level of x1, the third lens unit $G_3$ is shifted first toward the image side and then toward the object side for adjusting diopter when the magnification of the lens system is varied from the low magnification position to the high magnification position.

The Embodiment 4 of the present invention has the following numerical data and the aberration characteristics illustrated in FIG. 13 and FIG. 14 at the low magnification position and high magnification position thereof:

$f_I = 12.549-32.00, f_{II} = 27.28$ $r_1 = -69.4200$
$\quad d_1 = 1.5600 \quad n_1 = 1.49216 \quad \nu_1 = 57.50$
$r_2 = 15.6930$
$\quad d_2 = D_1$
$r_3 = 22.7820$
$\quad d_3 = 2.0000 \quad n_2 = 1.72916 \quad \nu_2 = 54.68$
$r_4 = -35.6780$
$\quad d_4 = 1.2100$
$r_5 = -11.9790$
$\quad d_5 = 1.3400 \quad n_3 = 1.80518 \quad \nu_3 = 25.43$
$r_6 = -50.2760$
$\quad d_6 = 1.0000$
$r_7 = -434.0600$
$\quad d_7 = 2.9000 \quad n_4 = 1.49216 \quad \nu_4 = 57.50$
$r_8 = -9.7950$ (aspherical surface)
$\quad d_8 = D_2$
$r_9 = -108.8020$
$\quad d_9 = 2.5000 \quad n_5 = 1.49216 \quad \nu_5 = 57.50$
$r_{10} = -21.6280$ (aspherical surface)
$\quad d_{10} = D_3$
$r_{11} = 22.6270$
$\quad d_{11} = 43.4000 \quad n_6 = 1.49216 \quad \nu_6 = 57.50$
$r_{12} = -22.6270$
$\quad d_{12} = 0.2000$
$r_{13} = 9.9770$ (aspherical surface)
$\quad d_{13} = 2.7600 \quad n_7 = 1.49216 \quad \nu_7 = 57.50$
$r_{14} = 12.3320$ -continued $f_I = 12.549-32.00, f_{II} = 27.28$ $\quad d_{14} = 16.3000$
$r_{15}$ eye point

|     | W      | S      | T      |
|-----|--------|--------|--------|
| $D_1$ | 21.922 | 15.395 | 4.992  |
| $D_2$ | 13.211 | 31.439 | 39.497 |
| $D_3$ | 12.356 | 0.656  | 3.00   |

Coefficient of aspherical surface
$P_8 = 1, E_8 = 0.11634 \times 10^{-3}$
$P_{10} = 1, E_{10} = -0.17234 \times 10^{-4}$
$F_{10} = 0.30064 \times 10^{-5}, G_{10} = -0.64352 \times 10^{-7}$
$H_{10} = 0.90312 \times 10^{-9}$
$P_{13} = 1, E_{13} = -0.44249 \times 10^{-4}$
$F_{13} = -0.36906 \times 10^{-6}$
$G_{13} = -0.65538 \times 10^{-8}$
$\beta_2 = -0.622 - -1.300, f_2/f_{IW} = 1.609$ The Embodiment 5 of the present invention has the composition illustrated in FIG. 6. Speaking concretely, the Embodiment 5 comprises: an objective lens system $G_I$ comprising a first lens unit $G_1$ consisting of a single negative lens component, a second lens unit $G_2$ consisting of a single positive aspherical lens component having an aspherical surface on one side and a third lens unit $G_3$ consisting of a single positive lens component having an aspherical surface on one side; a porro prism P having spherical incidence and exit end surfaces; and an eyepiece lens system $G_{II}$ comprising a single lens component having an aspherical surface on one side. In FIG. 6, the reference symbol $M_1$ represents the first reflecting surface (reflecting mirror), the reference symbols $M_2$, $M_3$ and $M_4$ designate the second, third and fourth reflecting surfaces respectively, and the reference symbol T denotes a visual field frame and a range finding frame.

Figure 15:
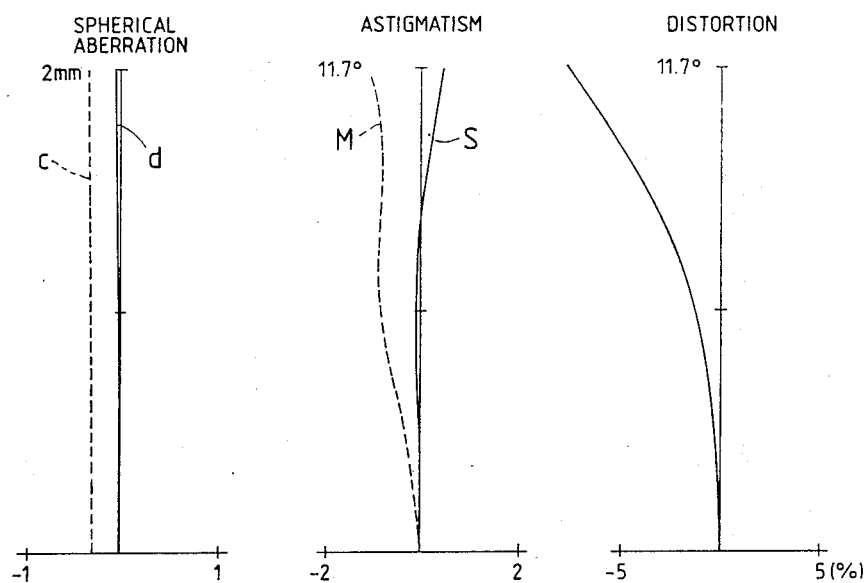
FIG. 15 and FIG. 16 show curves illustrating aberration characteristics of the Embodiment 5 of the present invention.
Figure 16:
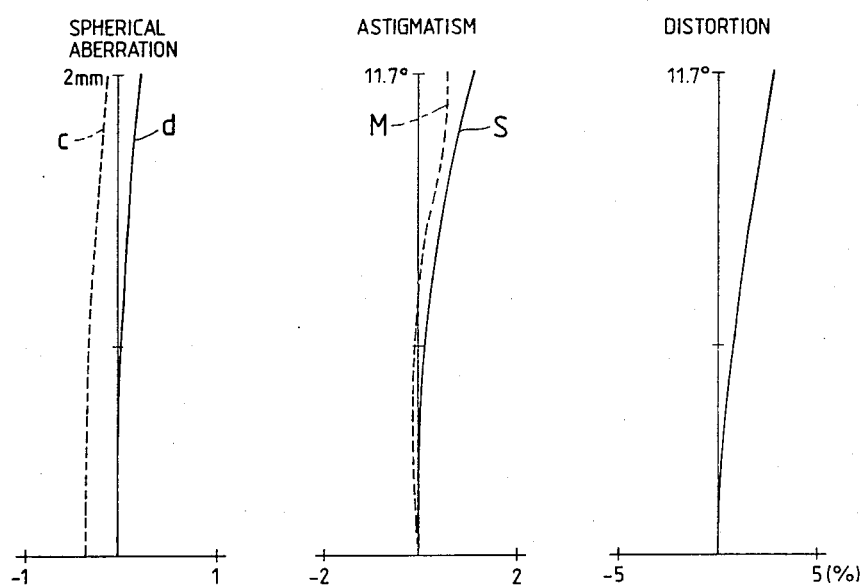

The Embodiment 5 of the present invention has the numerical data shown below and the aberration characteristics illustrated in FIG. 15 and FIG. 16 at the low magnification position and high magnification position thereof:

$f_I = 11.45-22.71, f_{II}'2\ 26.05$ $r_1 = 68.4137$
$\quad d_1 = 1.4248 \quad n_1 = 1.49216 \quad \nu_1 = 57.50$
$r_2 = 16.4468$
$\quad d_2 = D_1$
$r_3 = 15.1289$ (aspherical surface)
$\quad d_3 = 3.8000 \quad n_2 = 1.49216 \quad \nu_2 = 57.50$
$r_4 = -17.1758$
$\quad d_4 = D_2$
$r_5 = 28.3303$ (aspherical surface)
$\quad d_5 = 3.0000 \quad n_3 = 1.49216 \quad \nu_3 = 57.50$
$r_6 = -33.3135$
$\quad d_6 = D_3$
$r_7 = \infty$
$\quad d_7 = 8.0000$
$r_8 = 37.0672$
$\quad d_8 = 34.0321 \quad n_4 = 1.49216 \quad \nu_4 = 57.50$
$r_9 = -19.7062$
$\quad d_9 = 0.2101$
$r_{10} = 7.8399$ (aspherical surface)
$\quad d_{10} = 2.3824 \quad n_5 = 1.49216 \quad \nu_5 = 57.50$
$r_{11} = 7.9014$
$\quad d_{11} = 15.0200$
$r_{12}$ eye point

|     | W      | S      | T      |
|-----|--------|--------|--------|
| $D_1$ | 11.269 | 5.127  | 0.800  |
| $D_2$ | 0.933  | 10.686 | 20.118 |
| $D_3$ | 11.523 | 7.911  | 2.807  |

Coefficient of aspherical surface

-continued $$f_I = 11.45-22.71, f_{II}\,'2\ 26.05$$

$P_3 = -3.1230, E_3 = 0.13895 \times 10^{-3}$
$F_3 = -0.46660 \times 10^{-5}, G_3 = 0.13285 \times 10^{-6}$
$H_3 = -0.11850 \times 10^{-8}$
$P_5 = 1, E_5 = -0.24951 \times 10^{-3}$
$F_5 = 0.57378 \times 10^{-5}, G_5 = -0.11119 \times 10^{-6}$
$H_5 = 0.39585 \times 10^{-9}$
$P_{10} = 1, E_{10} = -0.82408 \times 10^{-4}$
$F_{10} = 0.34134 \times 10^{-7}$
$G_{10} = -0.42531 \times 10^{-7}$
$\beta_2 = -0.6\text{--}-0.88, f_2/f_{IW} = 1.48$ In the numerical data shown above, the reference symbols $f_I$ and $f_{II}$ represent focal lengths of the objective lens system $G_I$ and the eyepiece lens system $G_{II}$ respectively, the reference symbols $r_1, r_2, \ldots$ designate radio of curvature on the surfaces of the respective lens L elements, the reference symbols $d_1, d_2, \ldots$ denote thickness of the respective lens elements and airspaces reserved therebetween, the reference symbols $n_1, n_2, \ldots$ represent refractive indices of the respective lens elements, and the reference symbols $\nu_1, \nu_2, \ldots$ designate Abbe's numbers of the respective lens elements.

Further, when the direction of the optical axis is represented by x and the direction perpendicular to the optical axis is designated by s, the shapes of the aspherical surfaces used in the Embodiments are expressed by the following formula:

$$x = \frac{CS^2}{1 + \sqrt{1 - PC^2S^2}} + ES^4 + FS^6 + GS^8 + HS^{10}$$

wherein the reference symbol C represents curvature at the vertex of the aspherical surface ($=1/r$), the reference symbol P denotes conic constant, and the reference symbols E, F, G, H, ... designate coefficients of aspherical surface.

In the drawings illustrating the aberration characteristics of the Embodiments of the present invention, the pupil radius at the eye point is taken as the ordinate for spherical aberration, emerging angle from the eyepiece lens system is taken as the ordinate for astigmatism and distortion, and diopter is taken as the abscissa for aspherical aberration and astigmatism.

As is understood from the foregoing descriptions, the variable magnification viewfinder according to the present invention has a small diameter, a simple composition, a magnification ratio of 2 or higher and aberrations corrected very favorably.

We claim:

1. A variable magnification viewfinder comprising an objective lens system having positive refractive power as a whole and an eyepiece lens system having positive refractive power as a whole, said objective lens system comprising, in the order from the object side, a first lens unit having negative refractive power, a second lens unit having positive refractive power and a third lens unit having positive refractive power, and adapted in such a manner that magnification of said viewfinder is varied by shifting said second and third lens units along the optical axis with said first lens unit kept fixed.

2. A variable magnification viewfinder according to claim 1 satisfying the following condition:

$$1.2 < f_2/f_{IW}$$

wherein the reference symbol $f_2$ represents focal length of said second lens unit and the reference symbol $f_{IW}$ designates focal length of said objective lens system at the low magnification position thereof.

3. A variable magnification viewfinder according to claim 1 wherein said first lens unit comprises at least one negative lens component, and said second lens unit comprises at least one positive lens component and at least one negative lens component.

4. A variable magnification viewfinder according to claim 3 wherein the positive lens component in said second lens unit has a Abbe's number of at least 50 and the negative lens component in said second lens unit has an Abbe's number of 40 or smaller.

5. A variable magnification viewfinder according to claim 4 wherein the positive lens component and the negative lens component are cemented to each other in said second lens unit.

6. A variable magnification viewfinder according to claim 1 wherein said second lens unit has at least one aspherical surface and said third lens unit has at least one aspherical surface.

7. A variable magnification viewfinder according to claim 1 wherein said first lens unit comprises a negative lens component, said second lens unit comprises a positive lens component having low dispersive power, a negative lens component having high dispersing power and an aspherical lens component having an aspherical surface on one side, and said third lens unit comprises an aspherical lens component having an aspherical surface on one side.

8. A variable magnification viewfinder according to claim 7 wherein the positive lens component and the negative lens component are cemented to each other in said second lens unit.

9. A variable magnification viewfinder comprising:
an objective lens system having positive refractive power as a whole for forming an image of an object to be photographed; and
an eyepiece having positive refractive power as a whole for allowing observation of the image formed by said objective lens system,
wherein said objective lens system includes, in the order from an object side, a first lens unit having negative refractive power, a second lens unit having positive refractive power and a third lens unit having positive refractive power, and adapted in such a manner that magnification of said viewfinder is varied by shifting said second and third lens units along the optical axis with said first lens unit kept fixed and with optical members arranged on an image side of said objective lens system kept fixed in a direction along the optical axis of said viewfinder.

* * * * *